(12) United States Patent
Madan et al.

(10) Patent No.: US 12,117,907 B2
(45) Date of Patent: Oct. 15, 2024

(54) DATA REPLICATION USING AN EXTENDED FILE REPLICATION PROTOCOL

(71) Applicant: Dell Products L.P., Round Rock, TX (US)

(72) Inventors: Nitin Madan, Cupertino, CA (US); Bhimsen Bhanjois, Fremont, CA (US); Kalyan C. Gunda, Bangalore (IN); Srisailendra Yallapragada, Cupertino, CA (US); Alok Katiyar, Santa Clara, CA (US); Salil Dangi, Mission Viejo, CA (US); Sanjay Vedanthan, Santa Clara, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 90 days.

(21) Appl. No.: 17/733,550

(22) Filed: Apr. 29, 2022

(65) Prior Publication Data

US 2023/0350765 A1 Nov. 2, 2023

(51) Int. Cl.
*G06F 16/182* (2019.01)
*G06F 11/14* (2006.01)

(52) U.S. Cl.
CPC ...... *G06F 11/1464* (2013.01); *G06F 11/1451* (2013.01); *G06F 11/1469* (2013.01); *G06F 16/184* (2019.01); *G06F 2201/80* (2013.01)

(58) Field of Classification Search
CPC ............. G06F 11/1464; G06F 11/1451; G06F 11/1469; G06F 16/184; G06F 2201/80
See application file for complete search history.

(56) References Cited

U.S. PATENT DOCUMENTS

| 7,293,033 | B1* | 11/2007 | Tormasov | G06F 16/10 707/999.009 |
| 7,346,664 | B2 | 3/2008 | Wong et al. | |
| 7,587,422 | B2 | 9/2009 | Wong et al. | |
| 8,117,168 | B1 | 2/2012 | Stringham | |
| 10,437,682 | B1 | 10/2019 | Jonnala | |
| 2006/0271598 | A1* | 11/2006 | Wong | G06F 16/119 |
| 2009/0300079 | A1* | 12/2009 | Shitomi | G06F 3/0605 |
| 2011/0173180 | A1 | 7/2011 | Gurumurthy et al. | |
| 2014/0149476 | A1* | 5/2014 | Kishimoto | G06F 3/067 707/827 |

(Continued)

*Primary Examiner* — Cam Y T Truong
(74) *Attorney, Agent, or Firm* — WOMBLE BOND DICKINSON (US) LLP (57) ABSTRACT

Methods of cloning data backup across namespaces are disclosed. In response to receiving a file replication request, one or more source files are cloned from a first namespace to a second namespace, as one or more destination files. A first attribute indicating that the source file(s) have been cloned to the second namespace as the destination file(s) is created. A source synthetic file is cloned from the first namespace to the second namespace, as a destination synthetic file, where synthetic information of the destination synthetic file points to the source file(s) as one or more base file. A second attribute indicating that the source synthetic file has been cloned to the second namespace as the destination synthetic file is created. Based on the first and second attributes, the synthetic information of the destination synthetic file is updated or propagated to use the destination file(s) as one or more base files on the second namespace.

15 Claims, 9 Drawing Sheets

(56) References Cited

U.S. PATENT DOCUMENTS

| | | | |
|---|---|---|---|
| 2021/0200642 A1* | 7/2021 | Bangalore | G06F 11/1451 |
| 2021/0365438 A1* | 11/2021 | Carru | G06F 16/252 |
| 2022/0398220 A1* | 12/2022 | Khachane | G06F 16/1748 |
| 2023/0086547 A1* | 3/2023 | Hickey | G06F 16/13 |
| | | | 707/610 |
| 2023/0133361 A1 | 5/2023 | Shilane et al. | |

* cited by examiner

DATA REPLICATION USING AN EXTENDED FILE REPLICATION PROTOCOL

CROSS-REFERENCE TO RELATED APPLICATIONS

This application is related to application Ser. No. 17/733,510, filed Apr. 29, 2022, entitled "DATA REPLICATION USING SYNTHETIC RELATIONSHIPS BETWEEN FILES," the disclosure of which is incorporated herein by reference.

FIELD OF THE INVENTION

Embodiments of the present disclosure relate generally to data replication in storage systems. More particularly, embodiments of the disclosure relate to data replication using synthetic relationship between files after cloning the files across namespaces.

BACKGROUND

Figure 1:
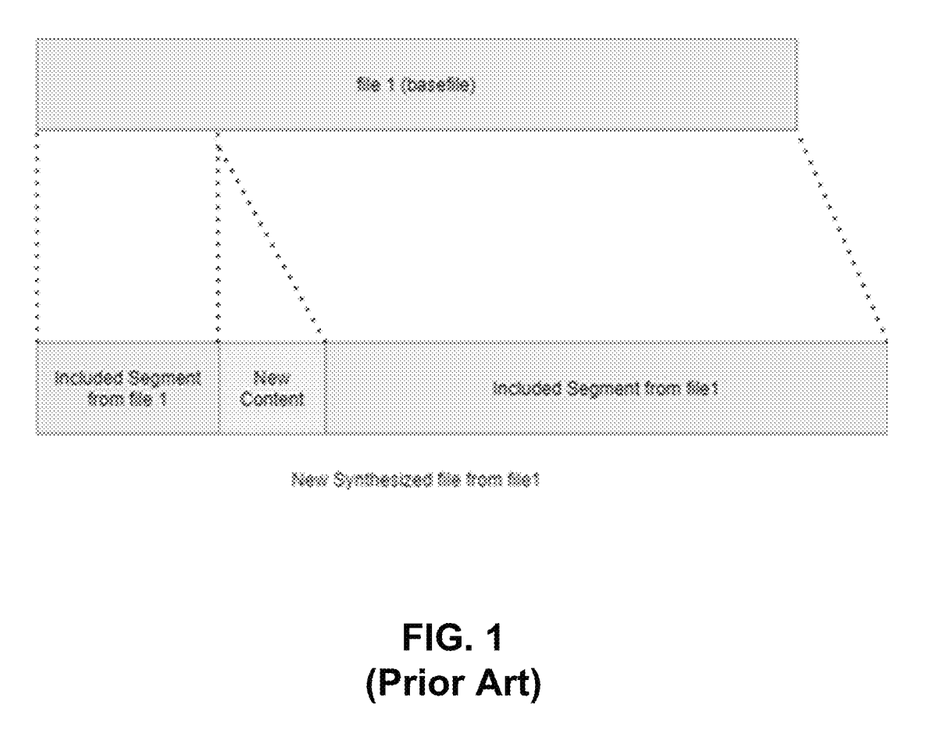
FIG. 1 is a diagram illustrating a conventional synthetic full backup system.

The need for data backups began when data storage systems were introduced. The problem has always been the capacity required for backups. Backup technologies have evolved from full backups, to weekly full backups/daily incremental backups, and to synthetic full backups. In the case of synthetic full backups, as illustrated in FIG. 1, a backup application would track the changes and relationships with a previous (synthetic) full backup. The application then creates a new synthetic full backup by commanding the storage system to include portions of the previous synthetic full backup into the new file. The incremental portions are written into the new synthetic full backup. Some advantages of a synthetic full backup include reduction of the size of the backup, and when a restore operation is performed, there is no need to patch. The synthetic full backup therefore is a complete backup image.

However, the logical size of the synthetic full backup is huge, often including large portions of the previous file. When a synthetic full backup operation is performed, synthetic information (also referred to as recipe) is generated and can resemble the following:

| Base file Index | File Handle/Metadata |
|---|---|
| 1 | File1 |

| Base file Index | Source Offset | Destination Offset | Size |
|---|---|---|---|
| 1 | 0 | 100000 | 100000 |
| 1 | 150000 | 10000000 | 9850000 |

The synthetic information would create an opportunity for a better/optimized replication of the backup. Instead of copying over the entire file to a replica, if relationships between the files are present, a deduplication file system can reconstruct a file by "including" from a parent file, and replicate only the incremental delta. The deduplication file system can track such relationships and also track information about the files that have been replicated and file handles for the replicated file at a destination.

Figure 2:
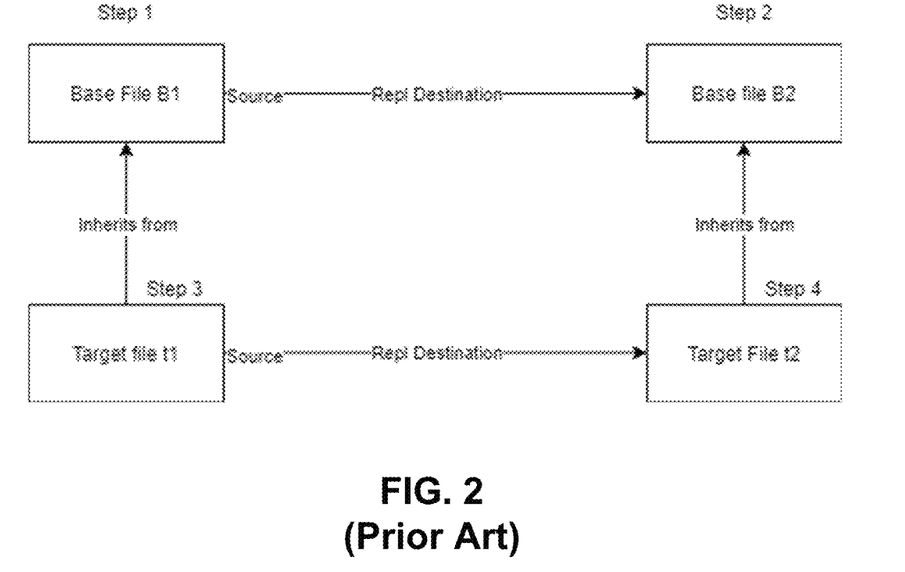
FIG. 2 is a diagram illustrating a deduplication file system that tracks relationships between files and information about the files that have been replicated.

As an example, referring to FIG. 2, at step 1, file B1 is ingested at a source storage system. At step 2, the file B1 is replicated to a target storage system as file B2. At step 3, a virtual synthetic file t1 is ingested at the source storage system. The file t1 includes data segments from the file B1 and any incremental portions (new content). At step 4, the file t1 is replicated to the target storage system as file t2.

Figure 3:
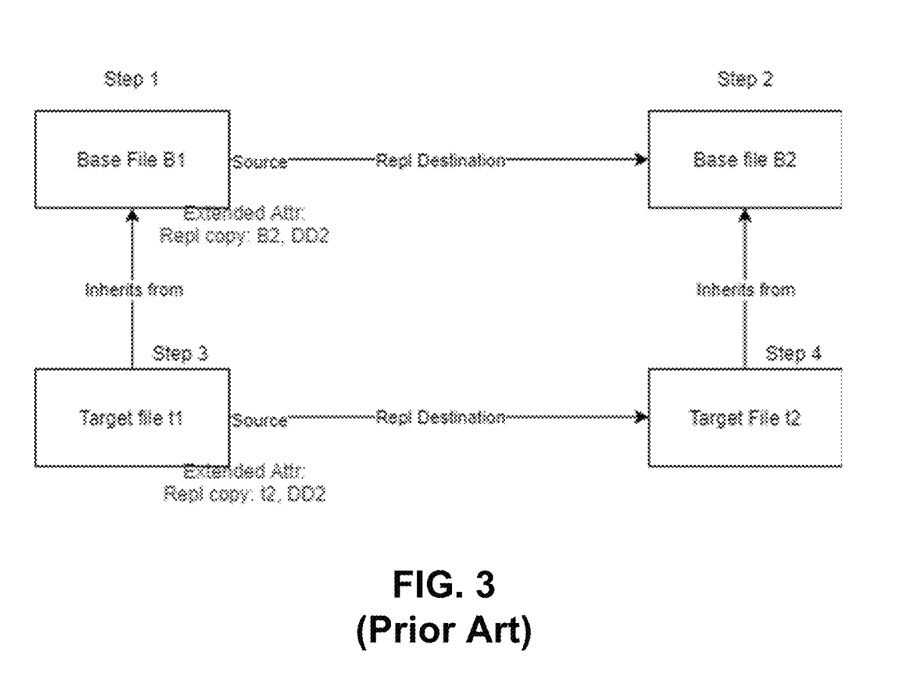
FIG. 3 is a diagram illustrating a deduplication file system that records a destination file handle of a replica for a base file in extended attributes.

Referring to FIG. 3, from the backend, when step 2 occurs the deduplication file system would discover that the file B1 is not a synthetic file. It therefore records the destination file handle of the replica for B1 (which is file B2 on a replica box, denoted as DD2). This information is recorded in the extended attributes for file B1.

At step 4, since file t1 is a virtual synthetic file, it would include segments from B1, and the deduplication file system therefore looks for a target file handle (B2) on the target data storage system. This information is used to recreate t2, by effectively replaying the recipe corresponding to t1, and sending only the new segments during the replication.

The above-discussed protocol is crafted to go over multiple base files, or absent or modified base files. It also has healthy checksums to avoid any corruptions. The recipe (or synthetic information) is useful for the deduplication file system and is kept opaque from users/applications. Unfortunately, there are scenarios where the recipe (or synthetic information) is not propagated. In those cases, in the absence of the synthetic information, the replication defaults to the traditional copy of the file.

In a deduplication file system, a traditional copy of the file implies that the segment fingerprints, which make up the file, are looked up against a destination storage system and the data corresponding to the segments, which are not present on the destination storage system, are sent over. In backup parlance, creating a copy of a backup is also referred to as cloning a backup. There are multiple use cases where the application requires to clone a backup to the same file system, such as applications that take a clone and overwrite the changed portions, applications that clone and overwrite the cloned files, and backup files that are cloned to a different namespace (e.g., mtree) to be snapshot or replicated to another node. When cloning to the same node, since the file already exists on the file system, reading and writing again (notwithstanding fingerprint hashes) seems wasteful. Thus, what is needed is something similar to a snapshot of a file, but with a new inode.

Some deduplication file systems, such as Dell EMC® Data Domain File System (DDFS), have a unique way of copying (or cloning) files, called fastcopy. The fastcopy functionality copies the content descriptor for file content into a new inode. This makes the copy into a new file with the same attributes. Since the recipe information is kept as extended attributes, the fastcopy of files across namespaces (e.g., mtrees) can also copy the attributes.

Figure 4:
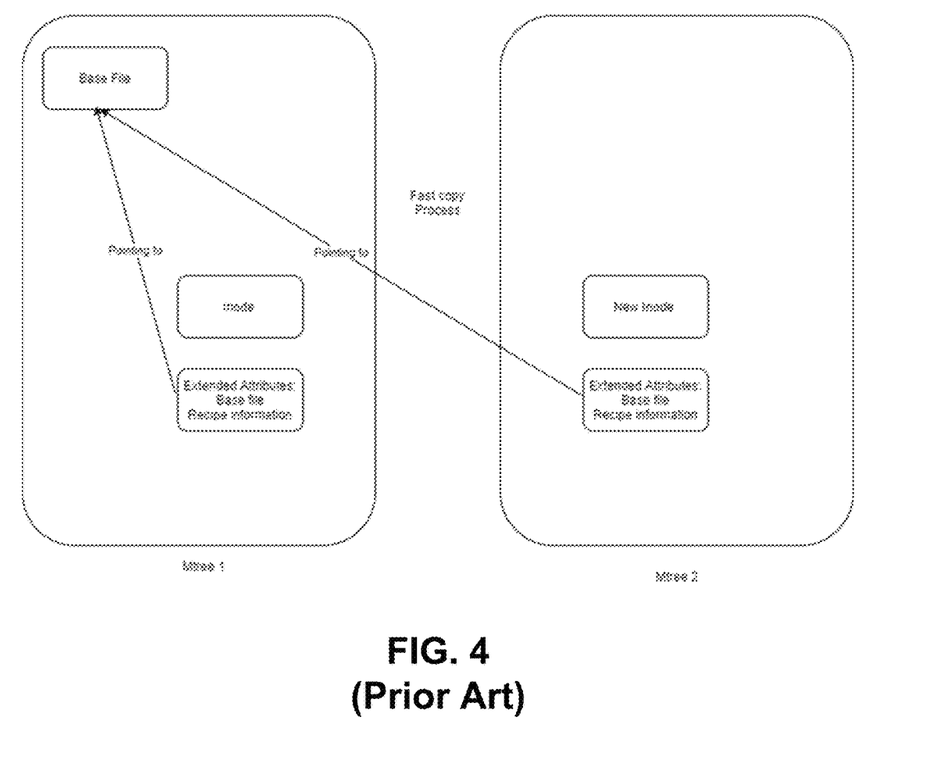
FIG. 4 is a diagram illustrating a fastcopy process performed across different namespaces.

While the fastcopy is a very efficient method, it has one shortcoming. For example, when the file is cloned (fastcopy) in the same namespace (e.g., mtree), the synthetic information is intact. However, when the fastcopy is done across different namespaces, the synthetic information is pointing to the base files in the original namespace (as shown in FIG. 4). In FIG. 4, even though the fastcopy functionality copies the extended attributes, which has the synthetic information, the synthetic information is pointing to a base file which is in another namespace. This makes the synthetic information useless for replication purposes. To illustrate the point, consider the following example.

Figure 5:
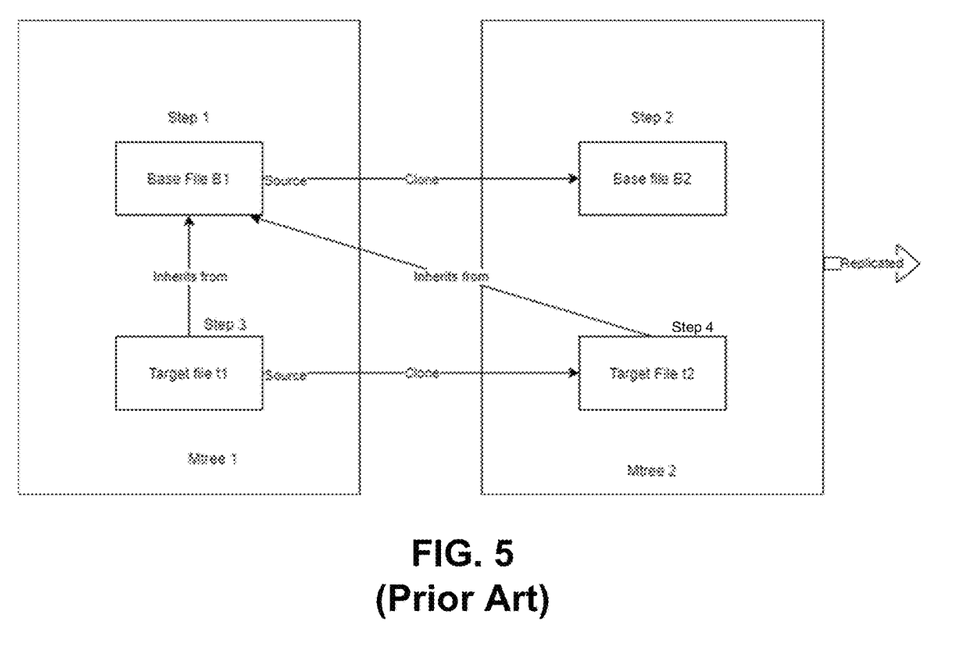
FIG. 5 is a diagram illustrating cloning of a base file and a virtual synthetic file from one namespace to another namespace.

Referring to FIG. 5, at step 1, a base file B1 is ingested to mtree1. At step 2, file B1 is cloned to mtree2 as B2. At step 3, a target file t1 is ingested to mtree1. Target file t1 is a virtual synthetic file and inherits from base file B1. At step 4, the target file t1 is cloned to mtree2 as target file t2. However, the target file t2 does not inherit from B2, and instead, it also inherits from the base file B1. Thus, the cloned file B2 cannot be tracked and the fastcopy process has no knowledge of the existence of B2. Unfortunately, if mtree2 were to be replicated, it cannot use the virtual synthetic advantages that t2 has inherited from B2. This is because B1 does not exist on the destination namespace.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

In some embodiments, provided herein is a method to track copy or cloning operations (e.g., fastcopies) and correct the base file information so that the replication process can use it. For example, using a dictionary of files, which have been copied or cloned (e.g., using fastcopy operation), and information propagated as part of the copy or cloning operation (e.g., fastcopy), the base file table can be corrected to point to a correct base file in the same namespace (e.g., mtree).

According to one aspect, a method of cloning data backup across namespaces is provided. In an embodiment, one or more source files may be cloned from a first namespace to a second namespace, as one or more destination files. When the cloning of the source file is performed, a data structure including source file information and destination file information may be generated. A source synthetic file may be cloned from the first namespace to the second namespace, as a destination synthetic file, where the source synthetic file uses the source file(s) as one or more base files on the first namespace. When the cloning of the source synthetic file is performed, the data structure may be looked up to obtain the source file information and the destination file information. Based on the source file information and the destination file information, synthetic information of the destination synthetic file may be updated to use the destination file(s) as one or more base files on the second namespace.

According to another aspect, another method of cloning data backup across namespaces is provided. In an embodiment, in response to receiving a file replication request, one or more source files may be cloned from a first namespace to a second namespace, as one or more destination files. A first attribute indicating that the source file(s) have been cloned to the second namespace as the destination file(s) may be created. A source synthetic file may be cloned from the first namespace to the second namespace, as a destination synthetic file, where synthetic information of the destination synthetic file points to the source file(s) as one or more base files. A second attribute indicating that the source synthetic file has been cloned to the second namespace as the destination synthetic file may be created. Based on the first and second attributes, the synthetic information of the destination synthetic file may be updated to use the destination file(s) as one or more base files on the second namespace.

Figure 6:
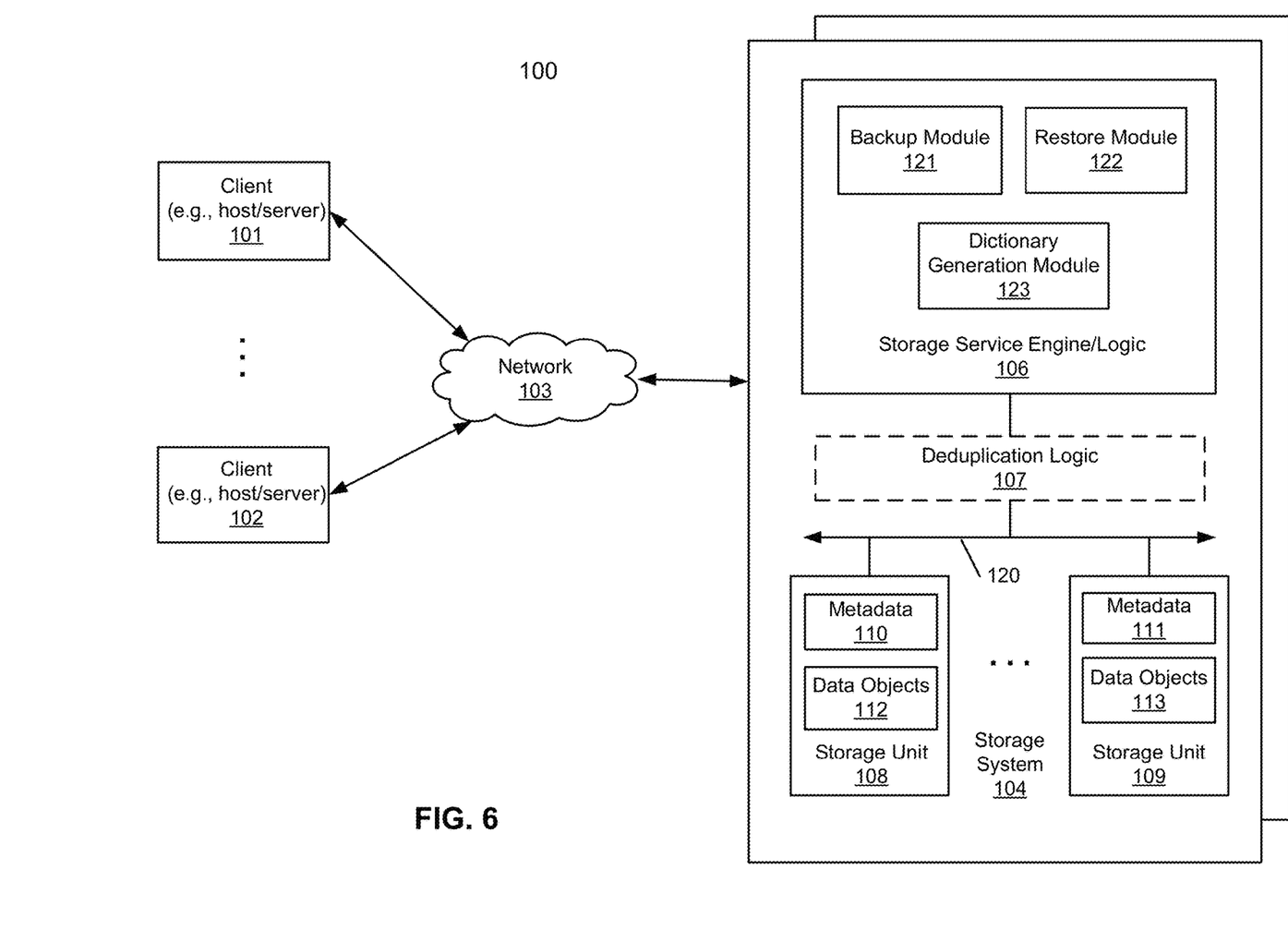
FIG. 6 is a block diagram illustrating a storage system according to one embodiment.

FIG. 6 is a block diagram illustrating a storage system according to one embodiment. Referring to FIG. 6, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), optional deduplication logic 107, and one or more storage units or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include backup logic 121, restore logic 122, and dictionary generation module 123. Backup logic 121 is configured to receive and back up data from a client (e.g., clients 101-102) and to store the backup data in any one or more of storage units 108-109. Restore logic 122 is configured to retrieve and restore backup data from any one or more of storage units 108-109 back to a client (e.g., clients 101-102).

In an embodiment, dictionary generation module or logic 123 is configured to track a source file and a destination file when a copy or cloning operation (e.g., fastcopy) is performed. For example, when the copy operation occurs, synthetic information (or recipe) associated with the source file is copied over to a destination namespace (e.g., mtree). However, it is unknown whether the base file associated with the recipe exists on the destination namespace. Fortunately, recipe metadata also includes a content handle associated with the base file. The content handle may hold the reference to the top reference (i.e., content of the base file). Thus, dictionary generation logic 123 may create a dictionary having a data structure (e.g., hash table) with the following relationship:

Content handle of the file: {content handle, file handle on local namespace}

As the files get copied or cloned (e.g., fastcopied) across namespaces, for example by backup logic 121 or a replicator (not shown), information corresponding to content handles of base files and information corresponding to destination file handles are recorded in the data structure. As an example, consider a scenario where a source file sf1 (source file handle sfh, content handle sch) was copied or cloned from a first namespace (e.g., mtree1) to a second namespace (e.g., mtree2) as destination file df1, with a destination file handle dfh. Note that the content handle does not change with the copy or cloning operation. Accordingly, the content of the data structure may resemble the following:

| Key | Value |
|---|---|
| sch, mtree2-mid | sch, dfh |

In an embodiment, a virtual synthetic file sf2, which uses the source file sf1 as the base file, may get copied from the first namespace to the second namespace. Accordingly, the recipe (or synthetic information) for sf2 may resemble the following table:

| Base file | Base file Index |
|---|---|
| sf1, sch, <path> | 1 |

| Base file index | Source offset | Destination offset | Size |
|---|---|---|---|
| 1 | 100 | 10000 | 2000 |
| ... | ... | ... | ... |

At the time the copy or cloning operation is performed, backup logic 121 (or any other logic) may look up the data structure and know that content handle sch has been copied or cloned to destination file handle dfh in the second namespace. Based on this information, it can be validated that the content handle of the destination file handle dfh is still the content handle sch. Then, the recipe for the virtual synthetic file sf2 may be changed or updated by updating or changing the base file information of the recipe from source file sf1 to destination file df1. The updated recipe for the virtual synthetic file sf2, for example, may resemble the following table:

| Base file | Base file Index |
|---|---|
| df1, sch, <path> | 1 |

| Base file index | Source offset | Destination offset | Size |
|---|---|---|---|
| 1 | 100 | 10000 | 2000 |
| ... | ... | ... | ... |

In some embodiments, the foregoing solution may be limited by the size of the dictionary. The dictionary may be configured to hold the files that have been copied or cloned across different namespaces. In an embodiment, the dictionary may be stored on a persistent storage device of storage system 104.

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In response to a data file to be stored in storage units 108-109, according to one embodiment, deduplication logic 107 is configured to segment the data file into multiple segments (also referred to as chunks) according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

Figure 7:
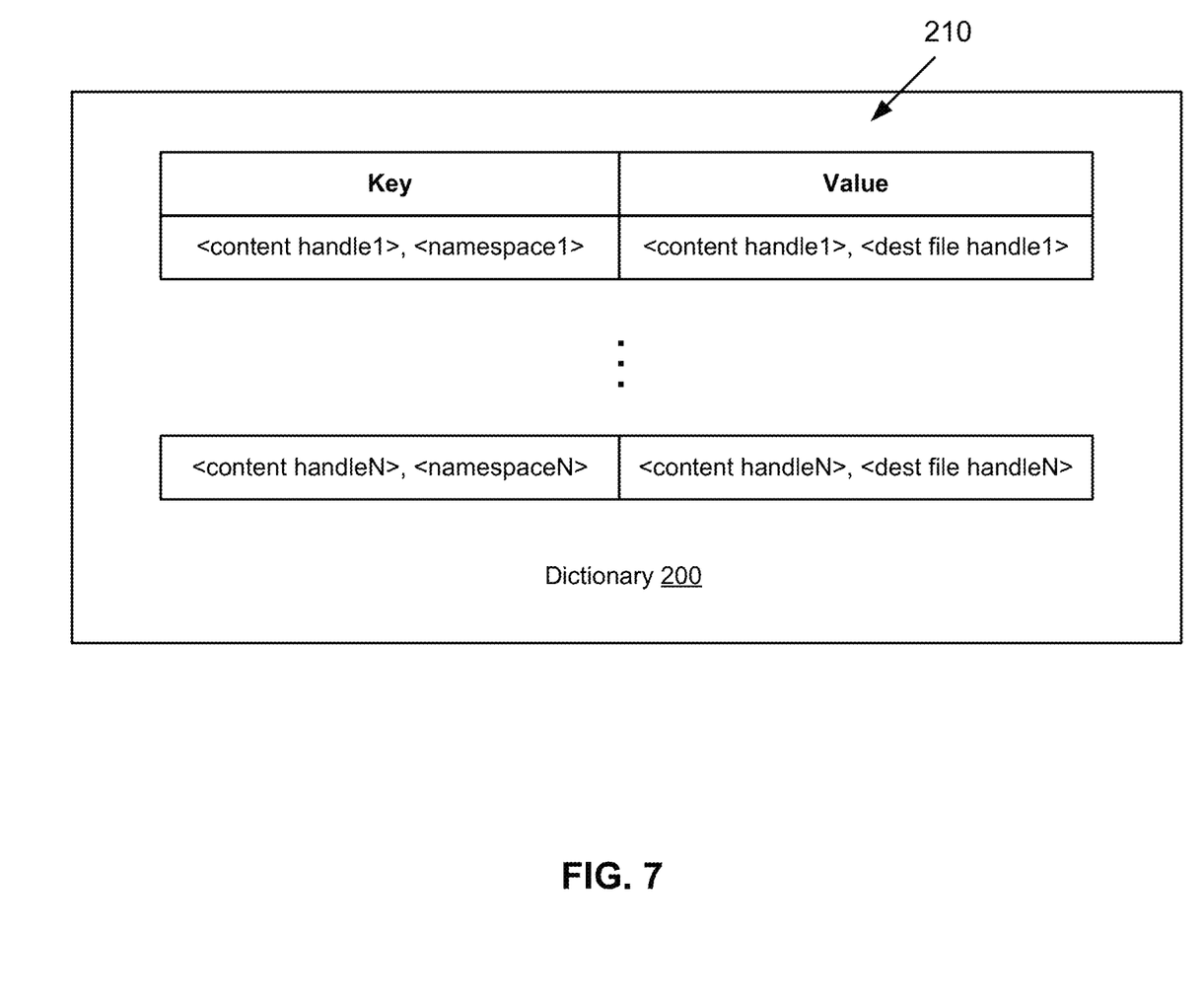
FIG. 7 is a diagram illustrating an example dictionary according to one embodiment.

FIG. 7 is a diagram illustrating an example dictionary according to one embodiment. As shown, dictionary 200 may include a data structure 210 (e.g., hash table) having key information and values associated with a number of files that have been copied or cloned across different namespaces. In data structure 210, the "Key" column may include content handles of source files (<content handle 1> . . . <content handle N>) and file handles on local namespaces (<namespace 1> . . . <namespace N>). The "Value" column may include the content handles of the source files and destination file handles of destination files (<dest file handle 1> . . . <dest file handle N>).

Figure 8:
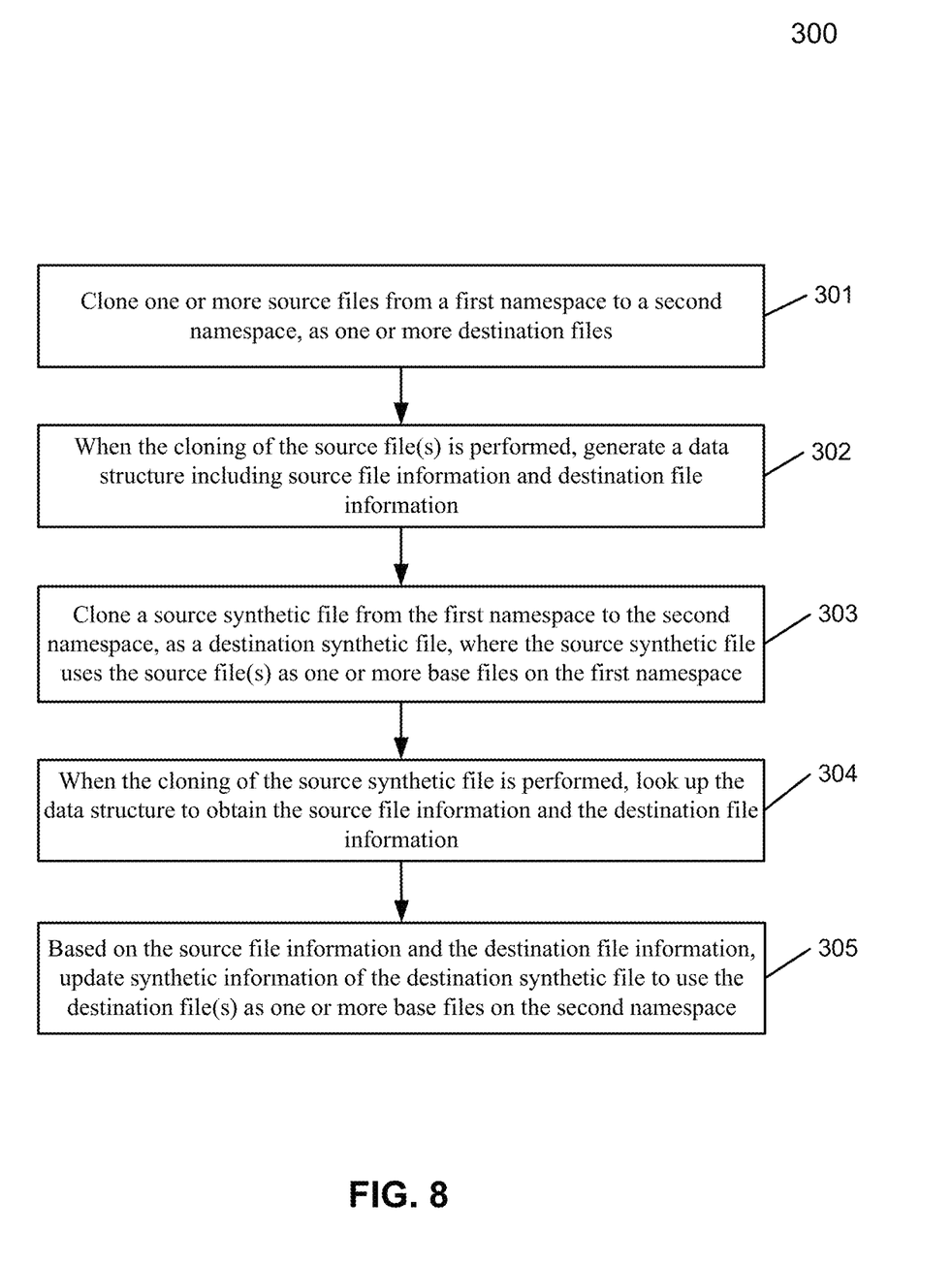
FIG. 8 is a flow diagram illustrating a process of cloning data backup across namespaces according to one embodiment.

FIG. 8 is a flow diagram illustrating a process of cloning data backup across namespaces according to one embodiment. Process 300 may be performed by processing logic that includes hardware (e.g. circuitry, dedicated logic, etc.), software (e.g., embodied on a non-transitory computer readable medium), or a combination thereof. For example, process 300 may be performed by dictionary generation module 123 of FIG. 6.

Referring to FIG. 8, at block 301, the processing logic clones one or more source files from a first namespace to a second namespace, as one or more destination files. At block 302, when the cloning of the source file(s) is performed, the processing logic generates a data structure including source file information and destination file information. At block 303, the processing logic clones a source synthetic file from the first namespace to the second namespace, as a destination synthetic file, where the source synthetic file uses the source file(s) as one or more base files on the first namespace. At block 304, when the cloning of the source synthetic file is performed, the processing logic looks up the data structure to obtain the source file information and the destination file information. At block 305, based on the source file information and the destination file information, the processing logic updates synthetic information of the destination synthetic file to use the destination file(s) as one or more base files on the second namespace.

Figure 9:
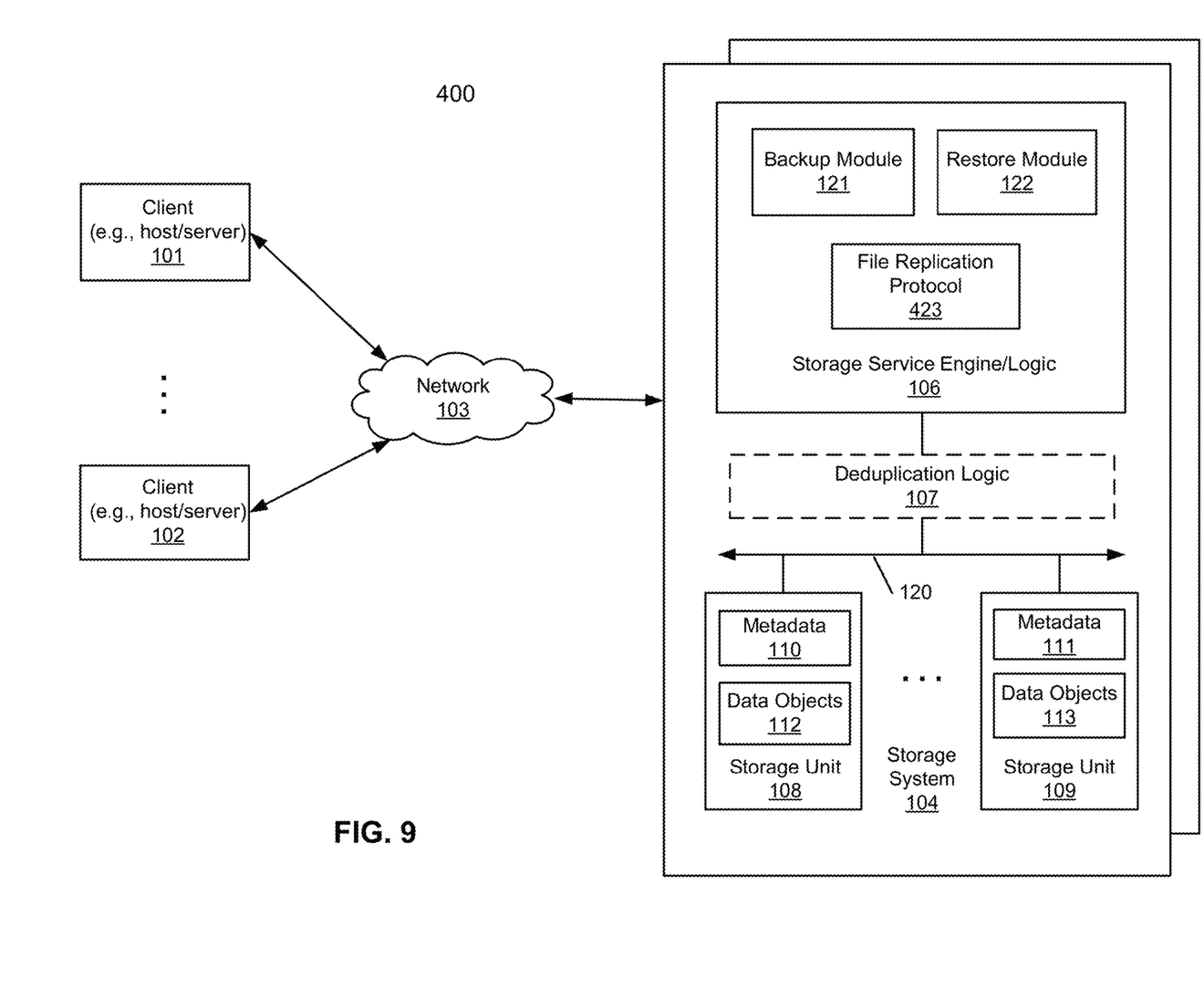
FIG. 9 is a block diagram illustrating a storage system according to another embodiment.

FIG. 9 is a block diagram illustrating a storage system according to another embodiment. The components of storage system 400 may be the same as or similar to the components of system 100 of FIG. 6. Thus, for brevity sake, those components are not described again herein.

Referring back to the example illustrated in FIG. 5, at step 1, a base file B1 is ingested to mtree1. At step 2, file B1 is cloned to mtree2 as B2. At step 3, a target file t1 is ingested to mtree1. Target file t1 is a virtual synthetic file and inherits from base file B1. At step 4, the target file t1 is cloned to mtree2 as target file t2. However, the target file t2 does not inherit from B2, and instead, it also inherits from the base file B1. Thus, the cloned file B2 cannot be tracked and the fastcopy process has no knowledge of the existence of B2. In this scenario, if mtree2 is to be replicated, it cannot use the virtual synthetic advantages that t2 has inherited from B2, since B1 does not exist on the destination namespace.

To resolve such problem, in another embodiment, a file replication protocol 423 (which may be included in storage service engine 106) can be extended. For example, file replication protocol 423 may establish a set of rules to create or add an extended attribute when a file cloning operation (e.g., fastcopy) is performed, with the extended attribute indicating that the file has been replicated from one namespace to another namespace.

As an example, referring back again to the example illustrated in FIG. 5, at step 2 where file B1 is cloned to mtree2 as file B2, as part of the file replication protocol 423, the clone command may be received as a file replication request (e.g., managed file replication (MFR) request). In response to the file replication request, backup logic 121 (or another logic such as a replicator) may identify that the destination namespace is on a same node as the source node (e.g., storage system 104). Accordingly, the backup logic 121 may switch to a handling where it may perform a copy or cloning operation (e.g., fastcopy) and create an extended attribute indicating that file B1 from mtree1 has been replicated to mtree2 as file B2.

Again, at step 3 the target (virtual synthetic) file t1 is ingested to mtree1. As previously described, the file t1 inherits from the base file B1. At step 4, file t1 is cloned to mtree2 as target file t2, though synthetic information of file t2 points to base file B1. In response to the file replication request, backup logic 121 (or another logic such as a replicator) may perform a copy or cloning operation (e.g., fastcopy) and add an extended attribute indicating that target file t1 has been cloned or replicated to mtree2 as target file t2. In an embodiment, the recipe or synthetic information for file t2 may be updated or propagated to point to base file B2 based on the information provided by the extended attribute.

Figure 10:
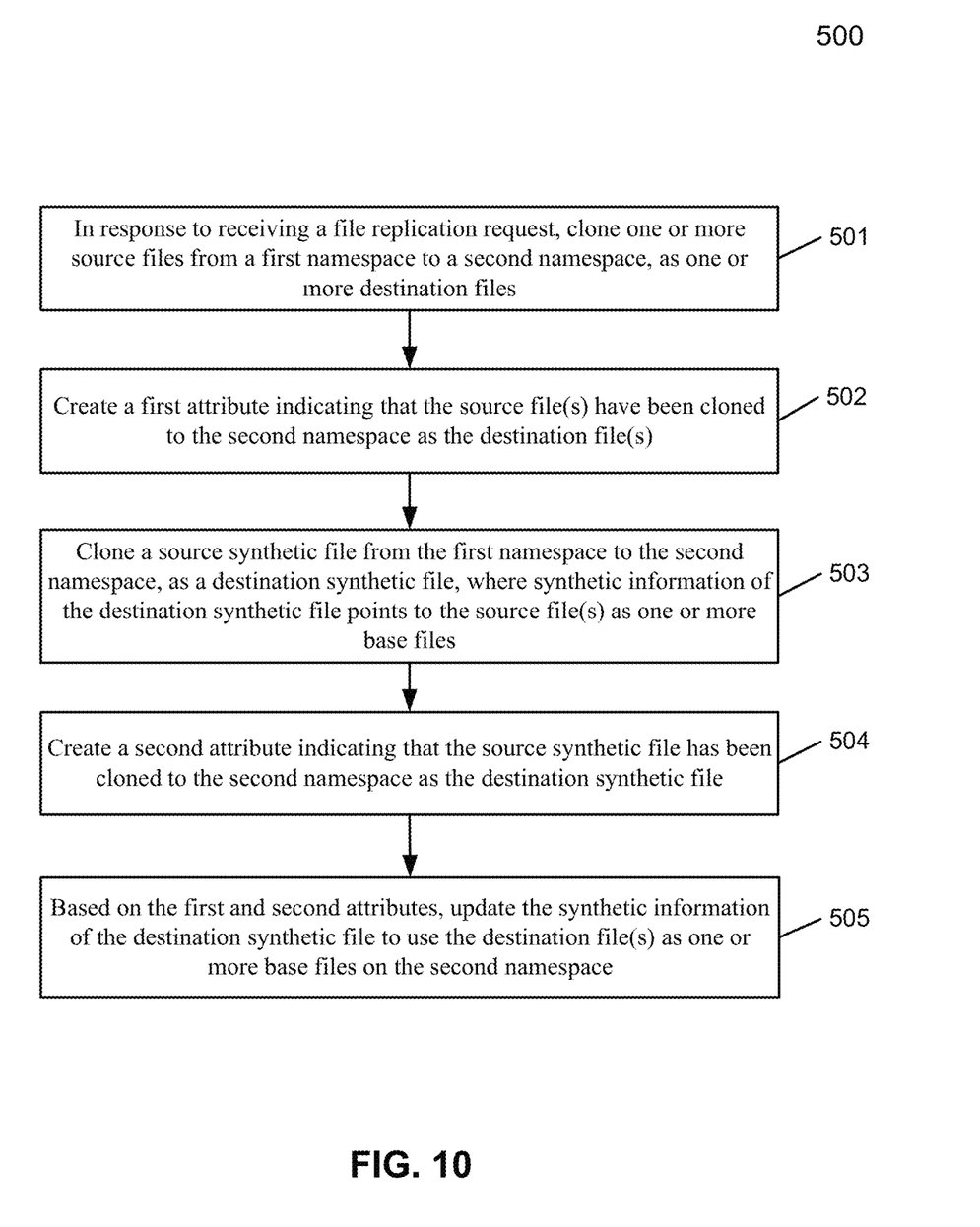
FIG. 10 is a flow diagram illustrating another process of cloning data backup across namespaces according to one embodiment.

FIG. 10 is a flow diagram illustrating another process of cloning data backup across namespaces according to one embodiment. Process 500 may be performed by processing logic that includes hardware (e.g. circuitry, dedicated logic, etc.), software (e.g., embodied on a non-transitory computer readable medium), or a combination thereof. For example, process 500 may be performed by backup logic 121 of FIG. 9 (or another logic such as a replicator) in accordance with file replication protocol 423 of FIG. 9.

Referring to FIG. 10, at block 501, in response to receiving a file replication request, the processing logic clones one or more source files from a first namespace to a second namespace, as one or more destination files. At block 502, the processing logic creates a first attribute indicating that the source file(s) have been cloned to the second namespace as the destination file(s). At block 503, the processing logic clones a source synthetic file from the first namespace to the second namespace, as a destination synthetic file, where synthetic information of the destination synthetic file points to the source file(s) as one or more base files. At block 504, the processing logic creates a second attribute indicating that the source synthetic file has been cloned to the second namespace as the destination synthetic file. At block 505, based on the first and second attributes, the processing logic updates the synthetic information of the destination synthetic file to use the destination file(s) as one or more base files on the second namespace.

Note that some or all of the components as shown and described above (e.g., backup module 121, restore module 122, dictionary generation module 123 of FIG. 6, file replication protocol 423 of FIG. 9) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 11:
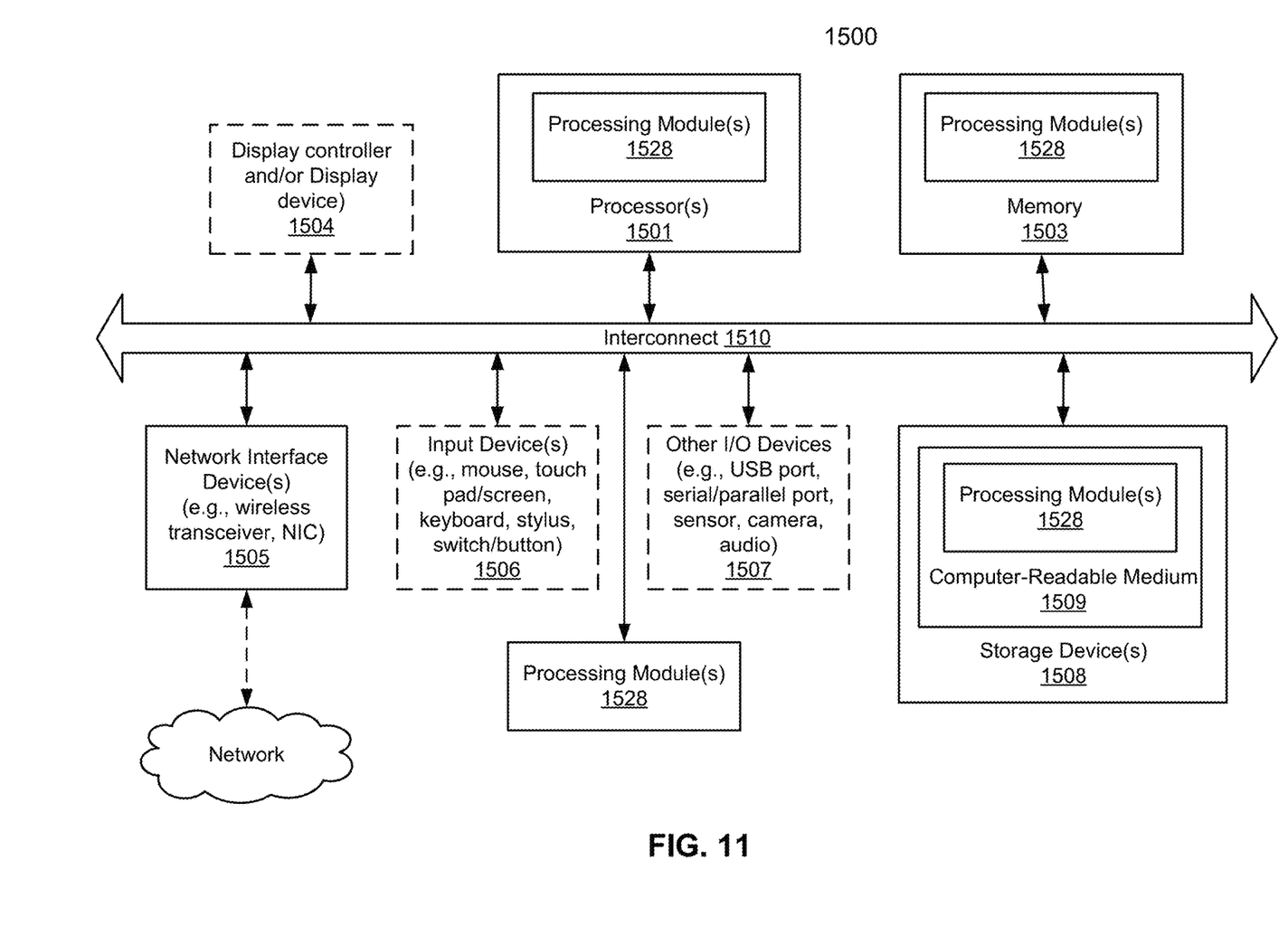
FIG. 11 is a block diagram illustrating a data processing system according to one embodiment.

FIG. 11 is a block diagram illustrating an example of a data processing system which may be used with one embodiment of the invention. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

TO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, backup module 121, restore module 122, dictionary generation module 123 of FIG. 6, and file replication protocol 423 of FIG. 9, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method of replicating synthetic data backup across namespaces, the method comprising:

in response to receiving a file replication request, cloning by a processor, one or more source files from a first namespace to a second namespace, as one or more destination files;

creating, by the processor, a first attribute indicating that the one or more source files have been cloned to the second namespace as the one or more destination files;

cloning, by the processor, one or more source synthetic files from the first namespace to the second namespace, as one or more destination synthetic files, wherein each source synthetic file of the one or more source synthetic files includes at least one data segment from a source file and incremental data associated with the source file, and respective synthetic information of the one or more destination synthetic files respectively point to the one or more source files as one or more base files on the first namespace;

creating, by the processor, a second attribute indicating that the one or more source synthetic files have been cloned to the second namespace as the one or more destination synthetic files; and based on the first and second attributes, updating by the processor, the respective synthetic information of the one or more destination synthetic files to respectively point to the one or more destination files as one or more base files on the second namespace, wherein each destination synthetic file of the one or more destination synthetic files includes at least one data segment from a destination file and incremental data associated with the destination file;

wherein the updating the respective synthetic information of the one or more destination synthetic files comprises changing one or more base file parameters in the respective synthetic information of the one or more destination synthetic files to respectively point to the one or more destination files.

2. The method of claim 1, wherein the cloning of the one or more source files and the cloning of the one or more source synthetic files are performed using fastcopy.

3. The method of claim 1, wherein the first and second namespaces are mtrees.

4. The method of claim 1, wherein the one or more source files and the one or more source synthetic files are ingested to the first namespace.

5. The method of claim 1, further comprising: in response to receiving the file replication request, identifying that the second namespace is on a same node as a source node.

6. A non-transitory machine-readable medium having instructions stored therein, which when executed by a processor, cause the processor to perform operations of replicating synthetic data backup across namespaces, the operations comprising:

in response to receiving a file replication request, cloning one or more source files from a first namespace to a second namespace, as one or more destination files;

creating a first attribute indicating that the one or more source files have been cloned to the second namespace as the one or more destination files;

cloning one or more source synthetic files from the first namespace to the second namespace, as one or more destination synthetic files, wherein each source synthetic file of the one or more source synthetic files includes at least one data segment from a source file and incremental data associated with the source file, and respective synthetic information of the one or more destination synthetic files respectively point to the one or more source files as one or more base files on the first namespace;

creating a second attribute indicating that the one or more source synthetic files have been cloned to the second namespace as the one or more destination synthetic files; and based on the first and second attributes, updating the respective synthetic information of the one or more destination synthetic files to respectively point to the one or more destination files as one or more base files on the second namespace, wherein each destination synthetic file of the one or more destination synthetic files includes at least one data segment from a destination file and incremental data associated with the destination file;

wherein the updating the respective synthetic information of the one or more destination synthetic files comprises changing one or more base file parameters in the respective synthetic information of the one or more destination synthetic files to respectively point to the one or more destination files.

7. The non-transitory machine-readable medium of claim 6, wherein the cloning of the one or more source files and the cloning of the one or more source synthetic files are performed using fastcopy.

8. The non-transitory machine-readable medium of claim 6, wherein the first and second namespaces are mtrees.

9. The non-transitory machine-readable medium of claim 6, wherein the one or more source files and the one or more source synthetic files are ingested to the first namespace.

10. The non-transitory machine-readable medium of claim 6, further comprising: in response to receiving the file replication request, identifying that the second namespace is on a same node as a source node.

11. A data processing system for replicating synthetic data backup across namespaces, the data processing system comprising:

a processor; and a memory coupled to the processor to store instructions, which when executed by the processor, cause the processor to perform operations, the operations including;

in response to receiving a file replication request, cloning one or more source files from a first namespace to a second namespace, as one or more destination files;

creating a first attribute indicating that the one or more source files have been cloned to the second namespace as the one or more destination files;

cloning one or more source synthetic files from the first namespace to the second namespace, as one or more destination synthetic files, wherein each source synthetic file of the one or more source synthetic files includes at least one data segment from a source file and incremental data associated with the source file, and respective synthetic information of the one or more destination synthetic files respectively point to the one or more source files as one or more base files on the first namespace;

creating a second attribute indicating that the one or more source synthetic files have been cloned to the second namespace as the one or more destination synthetic files; and based on the first and second attributes, updating the respective synthetic information of the one or more destination synthetic files to respectively point to the one or more destination files as one or more base files on the second namespace, wherein each destination synthetic file of the one or more destination synthetic files includes at least one data segment from a destination file and incremental data associated with the destination file;

wherein the updating the respective synthetic information of the one or more destination synthetic files comprises changing one or more base file parameters in the respective synthetic information of the one or more destination synthetic files to respectively point to the one or more destination files.

12. The data processing system of claim 11, wherein the cloning of the one or more source files and the cloning of the one or more source synthetic files are performed using fastcopy.

13. The data processing system of claim 11, wherein the first and second namespaces are mtrees.

14. The data processing system of claim 11, wherein the one or more source files and the one or more source synthetic files are ingested to the first namespace.

15. The data processing system of claim 11, further comprising: in response to receiving the file replication request, identifying that the second namespace is on a same node as a source node.

* * * * *